(12) United States Patent
Hendricks

(10) Patent No.: US 7,047,906 B1
(45) Date of Patent: May 23, 2006

(54) BIRD PERCH ASSEMBLY

(76) Inventor: Don R. Hendricks, 76 Ellisor Dr., Huntsville, TX (US) 77320

( * ) Notice: Subject to any disclaimer, the term of this patent is extended or adjusted under 35 U.S.C. 154(b) by 46 days.

(21) Appl. No.: 10/871,454

(22) Filed: Jun. 18, 2004

(51) Int. Cl.
*A01K 31/12* (2006.01)

(52) U.S. Cl. ............... 119/537; 119/706; D30/119; D21/826

(58) Field of Classification Search ......... 119/468, 119/531, 537, 706; 482/35; D21/826, 827; D30/119, 160
See application file for complete search history.

(56) References Cited

U.S. PATENT DOCUMENTS

| | | | |
|---|---|---|---|
| D153,272 S | 4/1949 | Forner | |
| 2,690,159 A | 9/1954 | Sherry | |
| 2,707,936 A | 5/1955 | Kiehl | |
| D175,292 S | 8/1955 | Perch | |
| D212,193 S * | 9/1968 | Rudy | D21/827 |
| 3,735,979 A * | 5/1973 | Levenberg | 482/143 |
| 4,627,384 A | 12/1986 | Courteau | |
| 4,877,237 A * | 10/1989 | Goble | 472/106 |
| 5,010,848 A | 4/1991 | Rankin | |
| 5,265,557 A | 11/1993 | Lovitz | |
| 5,381,758 A | 1/1995 | Simon | |
| 5,413,068 A | 5/1995 | Segal | |
| 5,474,025 A * | 12/1995 | Lee | 119/464 |
| 5,511,512 A | 4/1996 | Pintavalli | |
| 5,632,230 A | 5/1997 | Dornetta | |
| D400,314 S | 10/1998 | Nicolai | |

* cited by examiner

*Primary Examiner*—Robert P. Swiatek
(74) *Attorney, Agent, or Firm*—Stephen D. Carver

(57) ABSTRACT

A bird perch assembly has a polygonal base that perpendicularly supports an upwardly projecting structure that resembles a tree canopy and provides a comfortable perch and play area for pets, preferably exotic birds. A vertically upright, supporting post supports upper and lower pairs of vertically inclined ladders that are secured at an angle by suitable support brackets mated to the post. The lower vertical ladders are longer than the upper vertical ladders, and the tops of vertical ladders form a level plane above the base. Horizontal platform ladders that extend between the tops of the vertical ladders define a flat perch plane. The upwardly divergent vertical ladders from a "V-shaped" tree canopy.

19 Claims, 17 Drawing Sheets

US 7,047,906 B1

BIRD PERCH ASSEMBLY

BACKGROUND OF THE INVENTION

1. Field of the Invention

The present invention relates generally to perches and rests for captive birds. More particularly, the present invention relates to perches and play areas for relatively large exotic birds that must be provided substantial and adequate room for exercise and normal movements. Known prior art pertaining to this invention are classified in U.S. Pat. No. Class 119, Subclasses 468 and 531.

2. Description of the Related Art

Various exotic birds such as Macaws, African grays, Conour parrots, cockatoos, and Amazon birds are gaining in popularity as indoor pets. Numerous types of devices and play areas have become available for these birds. Suitable play apparatus must be stable and must be properly designed to allow climbing, swinging, and jumping in a safe and comfortable environment. An ample structure should provide horizontal and vertical perching as well as surfaces to accommodate walking and hanging upside down. In other words, perches must enable unobstructed movements for periodic exercise, to maintain the health and demeanor of pet bids. As the life span of captive birds often exceeds sixty years, many birds in captivity will eventually need rehabilitation. Perches must therefore be adequate for this facet of a bird's life.

Not all perches are readily accepted or trusted by pet birds. Such birds may be high strung and nervous, and many are naturally suspicious. Tropical birds may take weeks before acclimating to unfamiliar surroundings they experience when caged. New pets will examine their cage and associated perch structures, seemingly in great detail. Many birds are initially overcautious .and they may hesitate to try new apparatus or play areas. Perches or play areas appearing natural are therefore preferable. Natural perch structure and appearance can contribute to feelings of security and comfort for exotic birds. Previously, many exotic bird owners hung, placed or positioned ladders, perches, and swings wherever possible to try and create a more natural and somewhat comfortable environment. A natural environment produces a relaxed and more confident bird. Problems arise with a birds safety as they travel from one fixture to another with difficulty, and waste is deposited in undesirable locations.

Ladders are an efficient and safe type of play apparatus for birds. When deployed, they must be secured properly. Each end of a perch ladder must be adequately secured on a safe, stable object. A relatively long bridge type play area can be created by strapping ladders together, or by hanging them from ceilings or fixtures. However, known prior art attempts at using ladders with bird perches fail to address issues pertaining to structural integrity and animal safety.

Numerous bird cages and perches are known in the art. U.S. Pat. No. 5,413,068 issued to Segal May 9, 1995 provides a portable exercise device for birds that includes inclined, upwardly extending, ladder sections. The frame, which is carried within a suitcase-like container, can be unfolded to deploy various angular climbing members and traverse support members suitable for exercising and perching. A walkway is disposed near the top, forming a raised peak for perching birds.

Similarly, U.S. Pat. No. 5,010,848 issued to Rankin Apr. 30, 1991 discloses a folding travel cage that is stored in a self-contained case and which can be thereafter be unfolded for erection. An internal perch is disposed within the cage.

U.S. Pat. No. 5,265,557 issued to Lovitz Nov. 30, 1993 depicts a modular bird perch system including various interchangeable rods that can be user-configured to fit the size and volume of the cage.

U.S. Pat. No. 5,632,230 issued to Dornetta May 27, 1997 discloses a vertically upright bird perch constructed from a conventional camera tripod. A vertical perch and support platform is disposed atop the arrangement.

U.S. Pat. No. 4,627,384 issued to Courteau on Dec. 9, 1986 shows a vertically upright perch apparatus that emulates a tree. Various perch members with different diameters provide perching options to the confined bird.

U.S. Pat. No. 5,511,512 issued to Pintavalli on Apr. 30, 1996 shows a cylindrical bird cage with an internal perch.

U.S. Design patent No. 175,292 issued Aug. 8, 19555 shows an upright aviary perch that emulates a tree.

U.S. Design patents Nos. 153,272 issued Apr. 5, 1949 and 400,314 issued Oct. 27, 1998 and show bird perches that include ladder structure.

Despite the attempts of others in this art, I have found that pet birds do not naturally accept conventional perch assemblies quickly and without hesitation. Trees are part of a birds natural habitat and provide a safe world for exploration and resting. When absent from their natural habitat, i.e., trees, birds are vulnerable and their behavior reflects this fact. Uncomfortable birds may hop nervously about while looking in every direction, acting like a "fish out of water." Many prior art perch designs fail to understand this principle. Many designs suffer from numerous problems, as their usual small size does not facilitate unobstructed movements without sever twisting or jumping. Especially for injured, recovering birds, and older birds, an artificial perch that emulates a tree is exceptionally comfortable and highly desirable.

BRIEF SUMMARY OF THE INVENTION

This invention provides an upright, play area stand and perch assembly for large, medium and small pet or captive birds. The assembly emulates a natural tree. Preferably, a large, wheeled stand securely supports an upright vertical post. Preferably, two pairs of inclined, upwardly extending, vertical ladders are fixed in an upright, angular orientation relative to the support post for bird climbing. Flat, horizontally disposed platform ladders at the top of the assembly are supported by the four, upwardly-diverging vertical ladders. A smaller horizontal ladder placed flatly a the vertex of pair of vertical ladders aids dexterity. The resultant platform at an elevated position facilitates playing and stable resting. The combination emulates the natural environment of pet birds, and makes the device "user friendly."

Special wooden support brackets mounted on the main post secure and position the deployed ladders. Preferably the vertical ladders comprise an uppermost, oversized top step that extends outwardly past the ladder edges on both sides, which support and secure the horizontally-arranged platform ladders. All ladders are designed with step spacing to fit their use. Climbing vertical ladder steps or rungs are spaced preferably three inches. The narrower rung spacing on the horizontal ladders (i.e., preferably two inches) encourages bird walking, playing, running, and resting. On the other hand, the wider rung spacing on the vertical ladder elements encourages bird jumping and perching. Overall, the preferred arrangement results in a safer and more comfortable playing and running surface.

Preferably, the vertical ladder elements are angularly secured to the support post with special brackets. These brackets facilitate assembly or disassembly, aiding shipping.

The brackets enable easy storage without removing the vertical ladders. The vertical ladders pivot to assume a smaller storage area without complete disassembly.

Thus, a basic object of my invention is to provide an artificial perch for caged pet birds.

It is also fundamental to make a perch that simulates a natural tree.

Another object of my invention is to provide a comfortable perch and platform for large birds that emulates a tree.

It is also a fundamental object to provide a perch for exotic birds including Macaws, African grays, Conour parrots, cockatoos, and Amazon birds.

Another object is to provide a bird perch characterized by easy user assembly. It is a feature of this invention that the preferred brackets are fixed in position for easy and perfect assembly of the tree.

An object to stimulate the curiosity of confined, pet birds.

A further object of this invention is to provide a perching apparatus for pet birds that facilitates periodic exercise, and thus help maintain a healthy demeanor for confined pets.

Another basic object of the invention is to provide a comfortable perch structure that readily enables various movements, including climbing or jumping.

A related object is to provide a comfortable indoor habitat for pet birds that encourages them to sit, exercise and play.

It is also an object to provide a tree-emulating assembly that is made without the use of metallic fasteners.

Another important object is to facilitate safe and easy walking and unobstructed transitions from one perch object to another.

The product is made of untreated non toxic wood to emulate the birds natural environment.

It is also an object to provide an artificial perch structure for birds that:
a) Simulates and maintains a natural tree structure natural environment;
b) Utilizes minimal man-made products steel, plastic, or other unnatural elements;
c) Provides a surface for healthy and recuperating birds to climb and travel upwardly from a post to a limb;
d) Creates an upper platform that is stable and secure for walking and swinging;
e) Emulates a tree canopy (top) where birds thrive;
f) Orients various surfaces and platforms to create a tree whose parts are readily accessed by the bird; and,
g) Facilitates movements between surfaces and platform element by walking, swinging upright and upside down.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
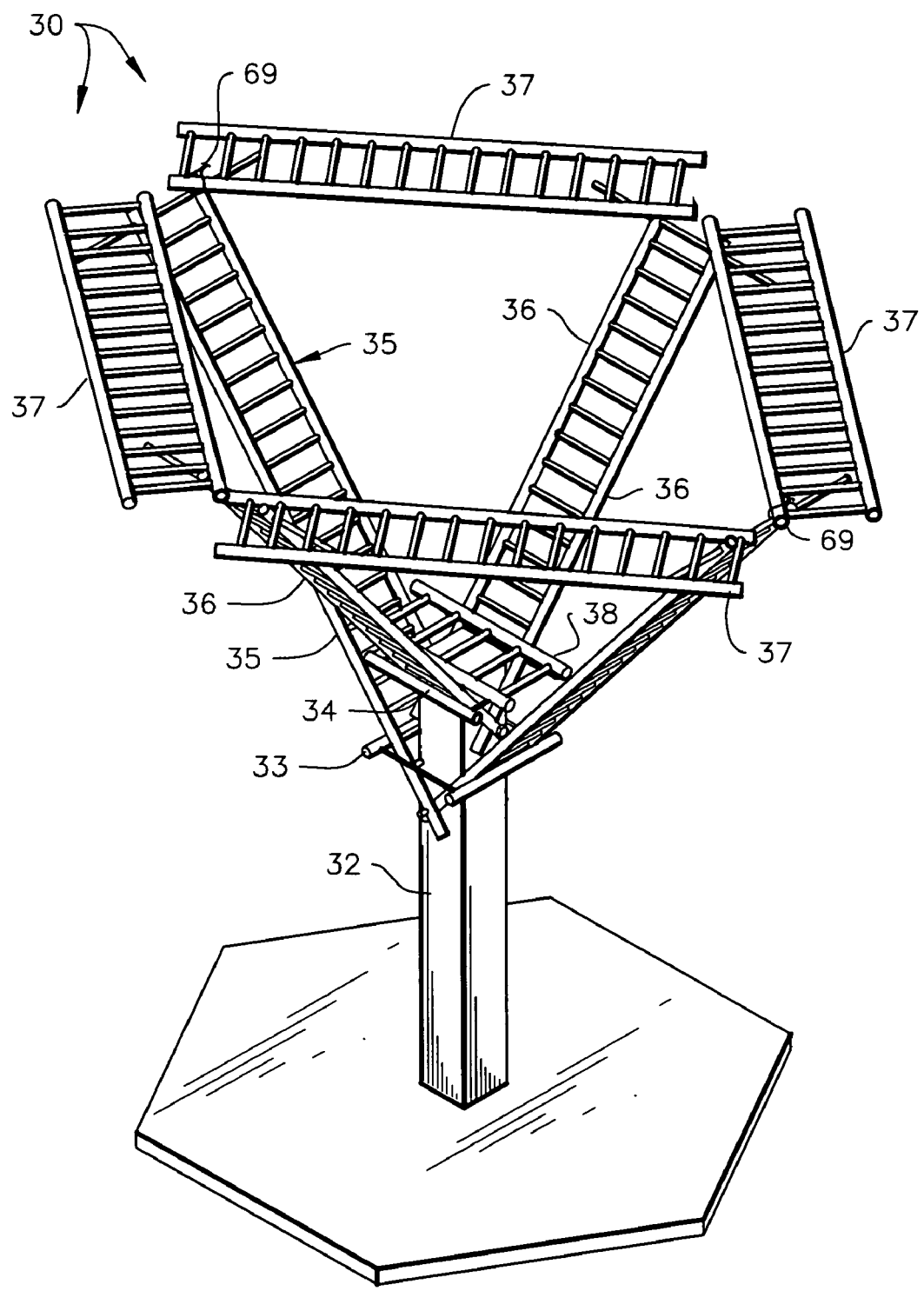
FIG. 1 is a top isometric view showing the best mode of my Bird Perch Assembly.
Figure 2:
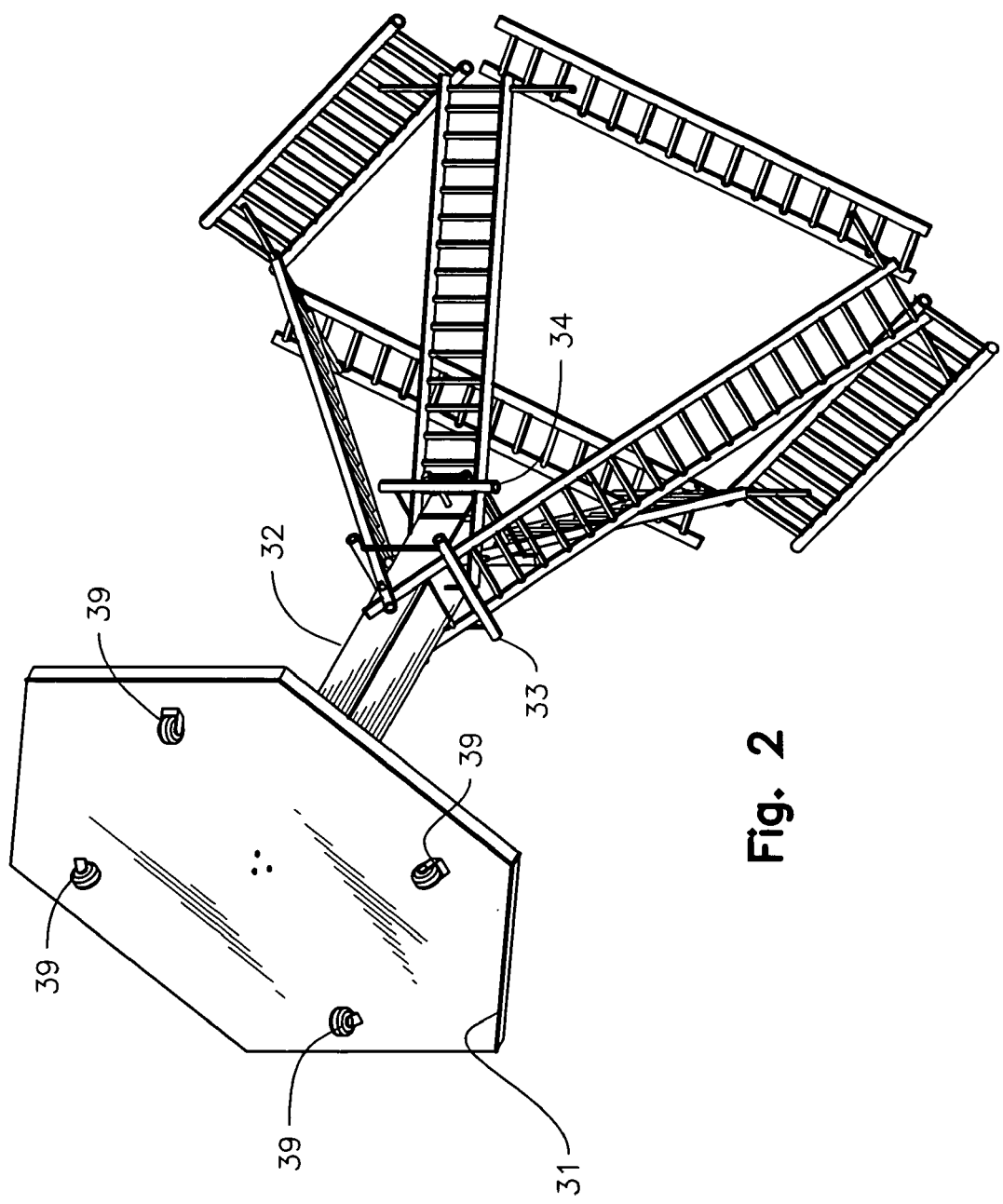
FIG. 2 is a bottom isometric view thereof.
Figure 3:
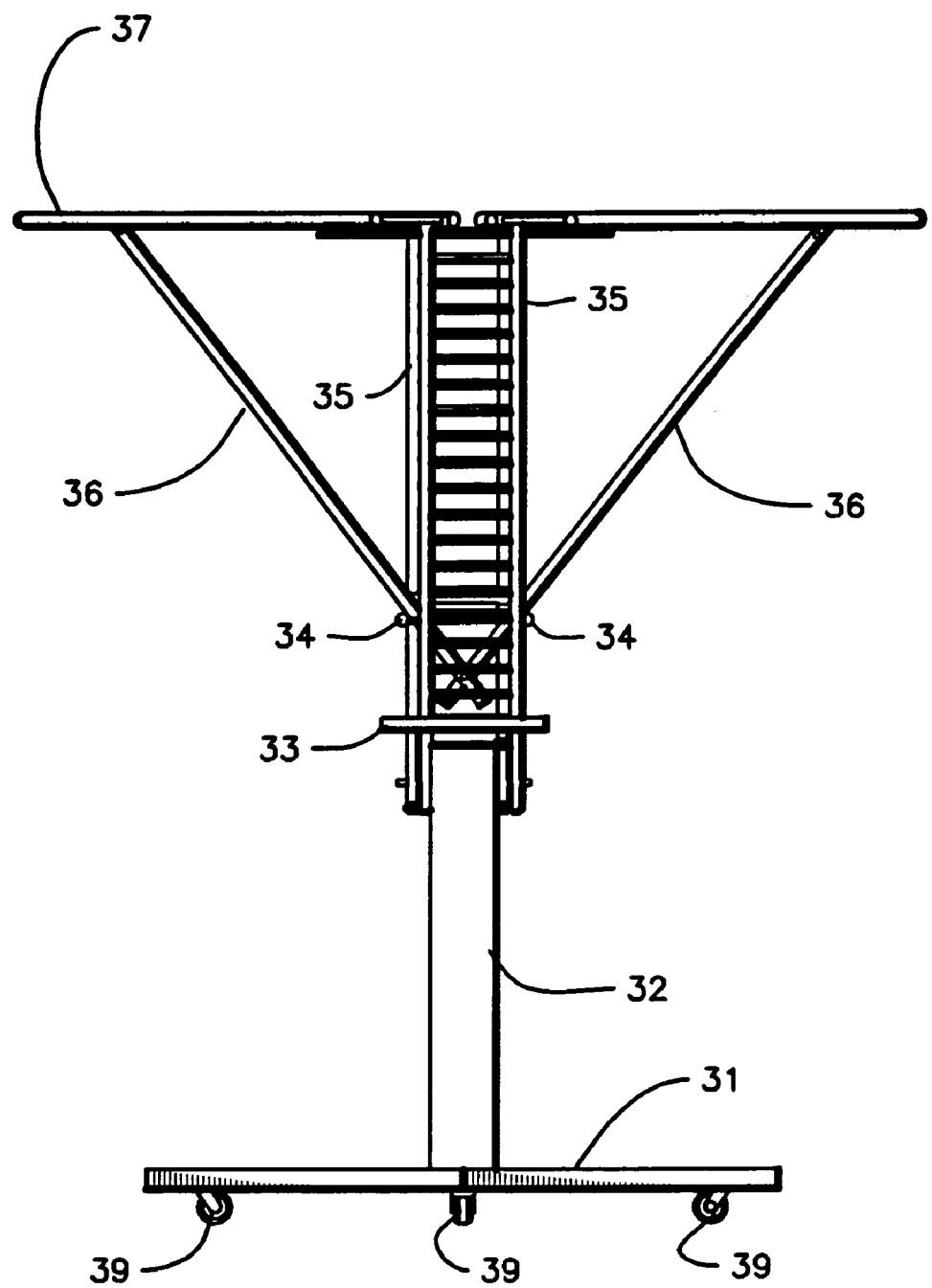
FIG. 3 is a front plan view thereof.

Turning initially now to FIGS. 1–10 of the appended drawings, my new bird perch assembly has been generally designated by the reference numeral 30. A generally planar, preferably polygonal base 31 is supported upon a lower, planar support surface 29 (FIG. 1) provided by ground or the interior bottom of a suitable bird cage (not shown). The base 31 supports a vertically upright, supporting post 32 that is perpendicularly mounted at the center of the base 31. A lower support bracket 33 mounted to post 32 supports a lowermost pair of vertically inclined ladders 35 that diverge upwardly. An upper support bracket 34 mounted on post 32 above lower support bracket 33 supports an upper pair of vertically inclined, upwardly diverging ladders 36. Lower ladders 35, which are longer than ladders 36, are sized such that the tops of ladders 35 and 36 form a level plane above base 31. Horizontal ladders 37 occupy the latter plane, extending between the aligned tops of ladders 35, 36, and forming an upper platform region of the perch. A lower, smaller, reduced-length horizontal ladder 38 extends between and is cable-tied to the bottoms of ladders 36 near their junction region at the top of post 32. Ladder 38 thus occupies a plane that is parallel with the plane formed by the upper, longer horizontal ladders, and which is parallel with and spaced above said base. Preferably, a plurality of spaced-apart caster wheels 39 (FIG. 3) are secured at the bottom of base 31 for easier movements over surface 29.

Figure 4:
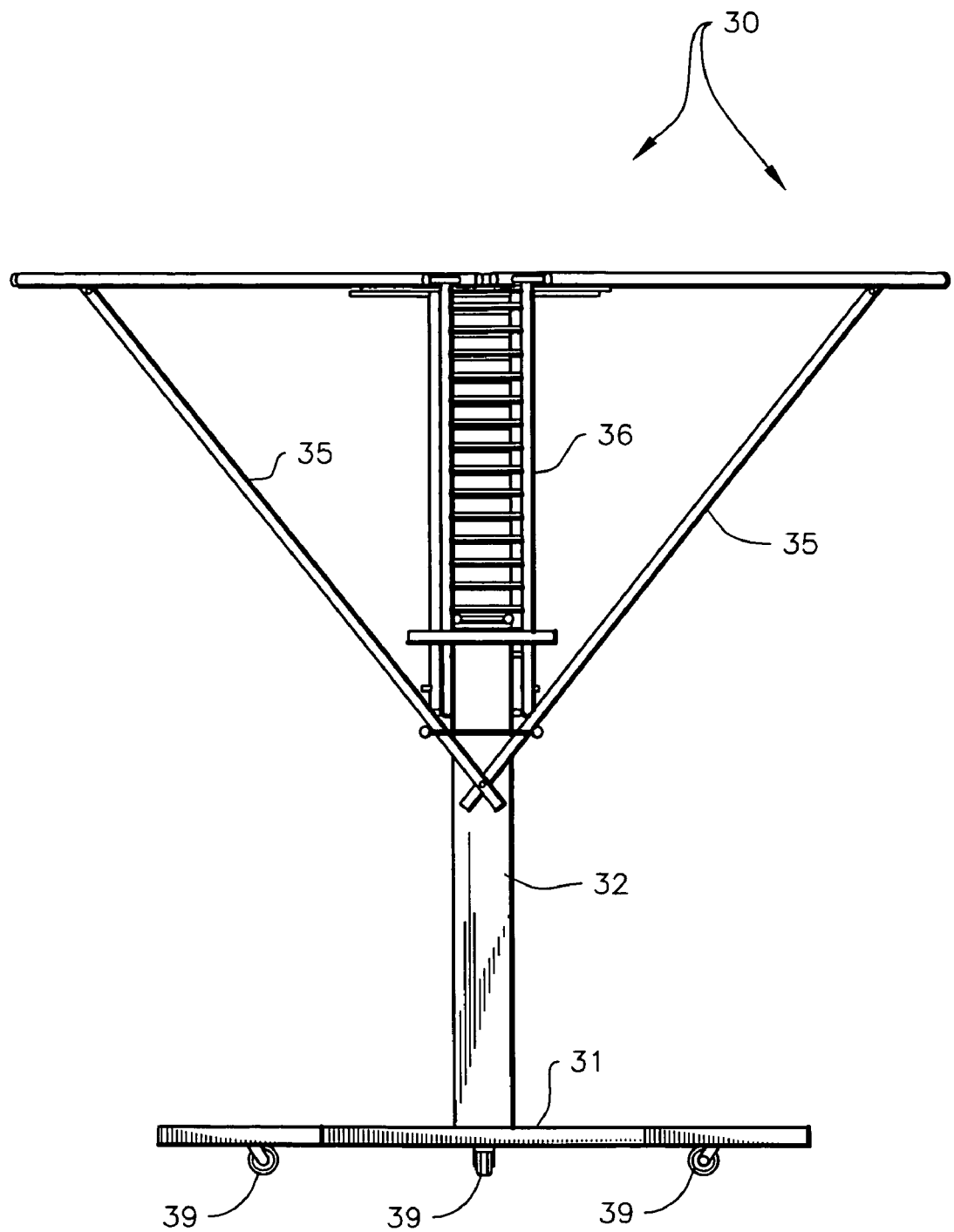
FIG. 4 is a left side elevational view thereof.
Figure 5:
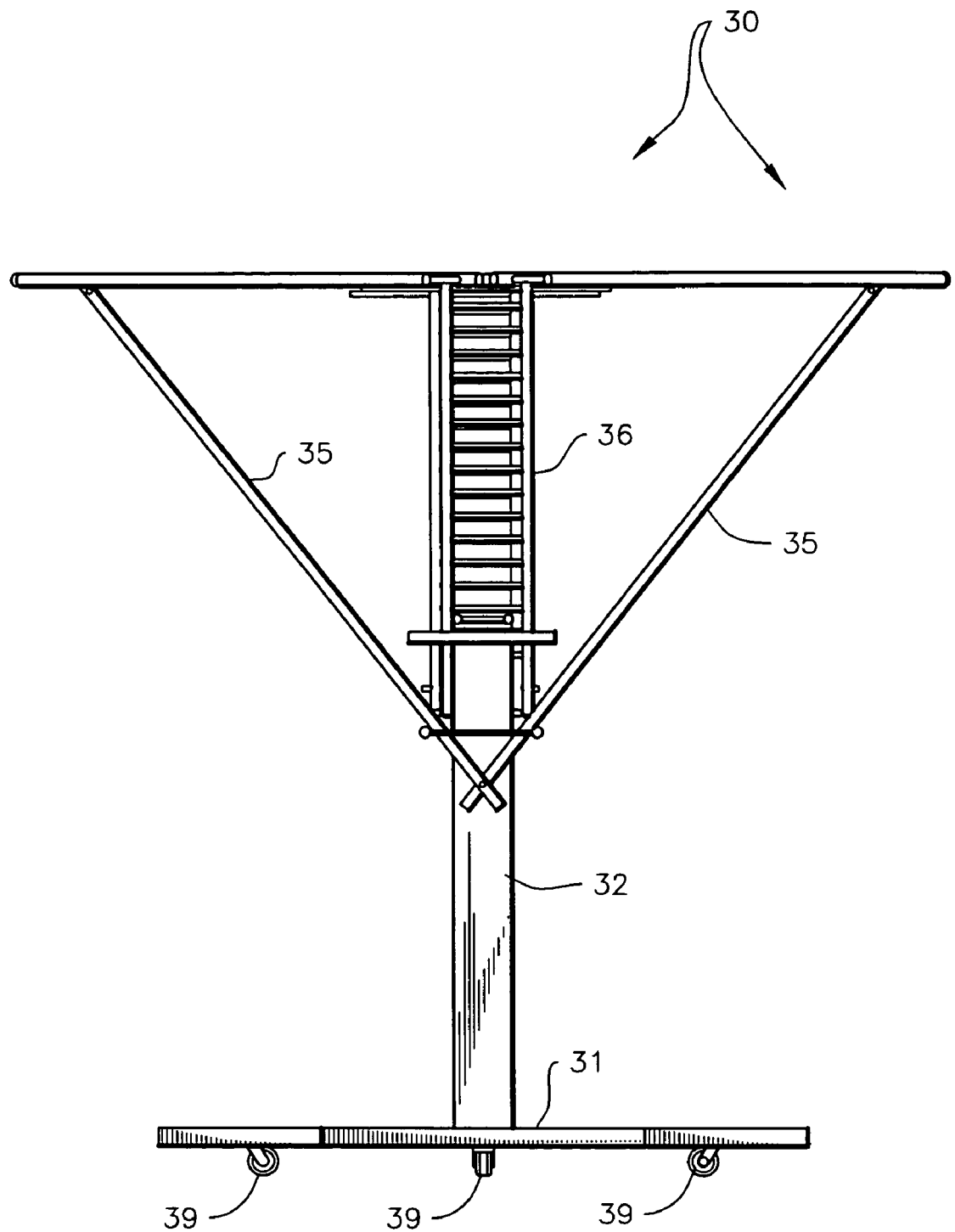
FIG. 5 is a right side elevational view thereof.
Figure 6:
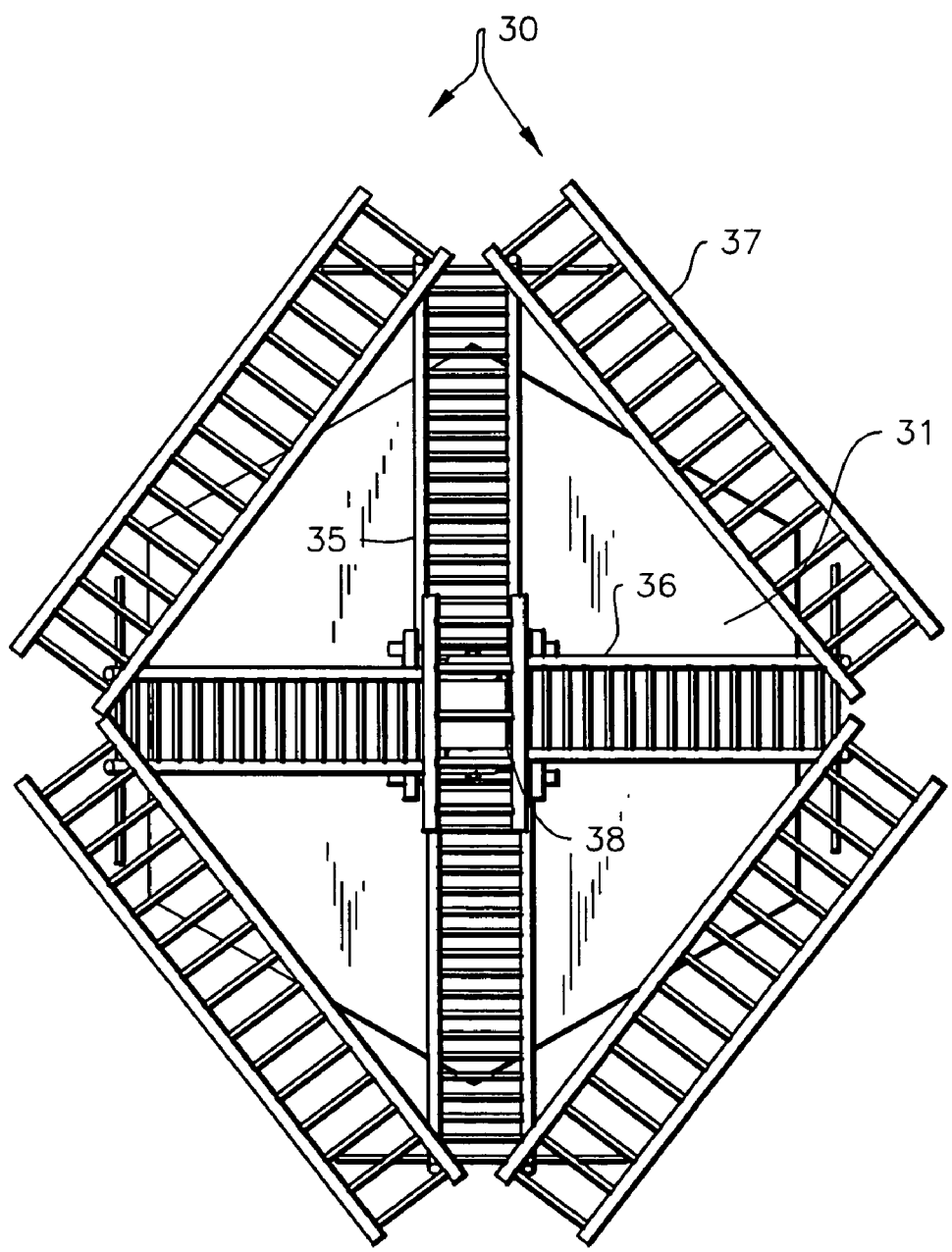
FIG. 6 is a top plan view.
Figure 7:
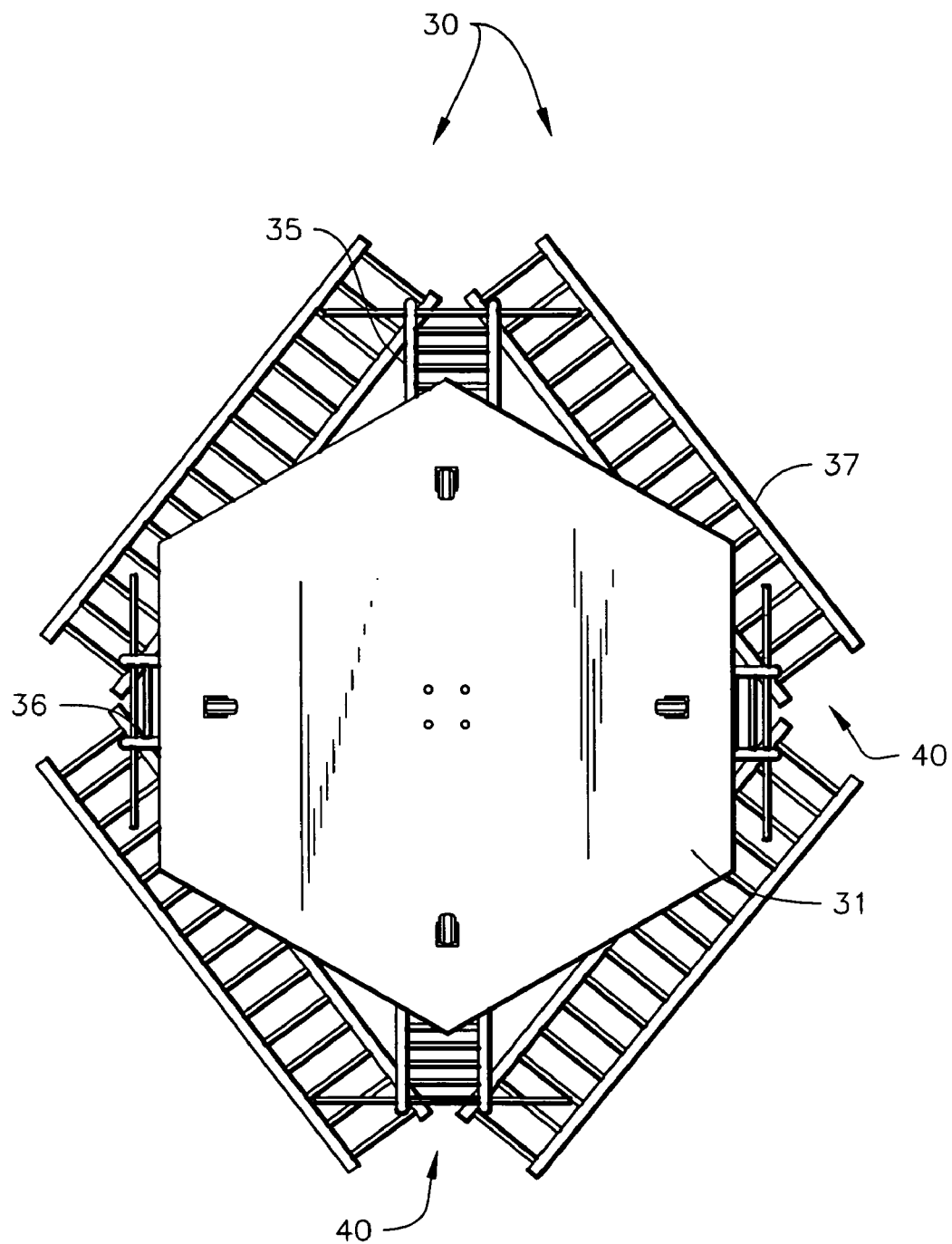
FIG. 7 is a bottom plan view.
Figure 8:
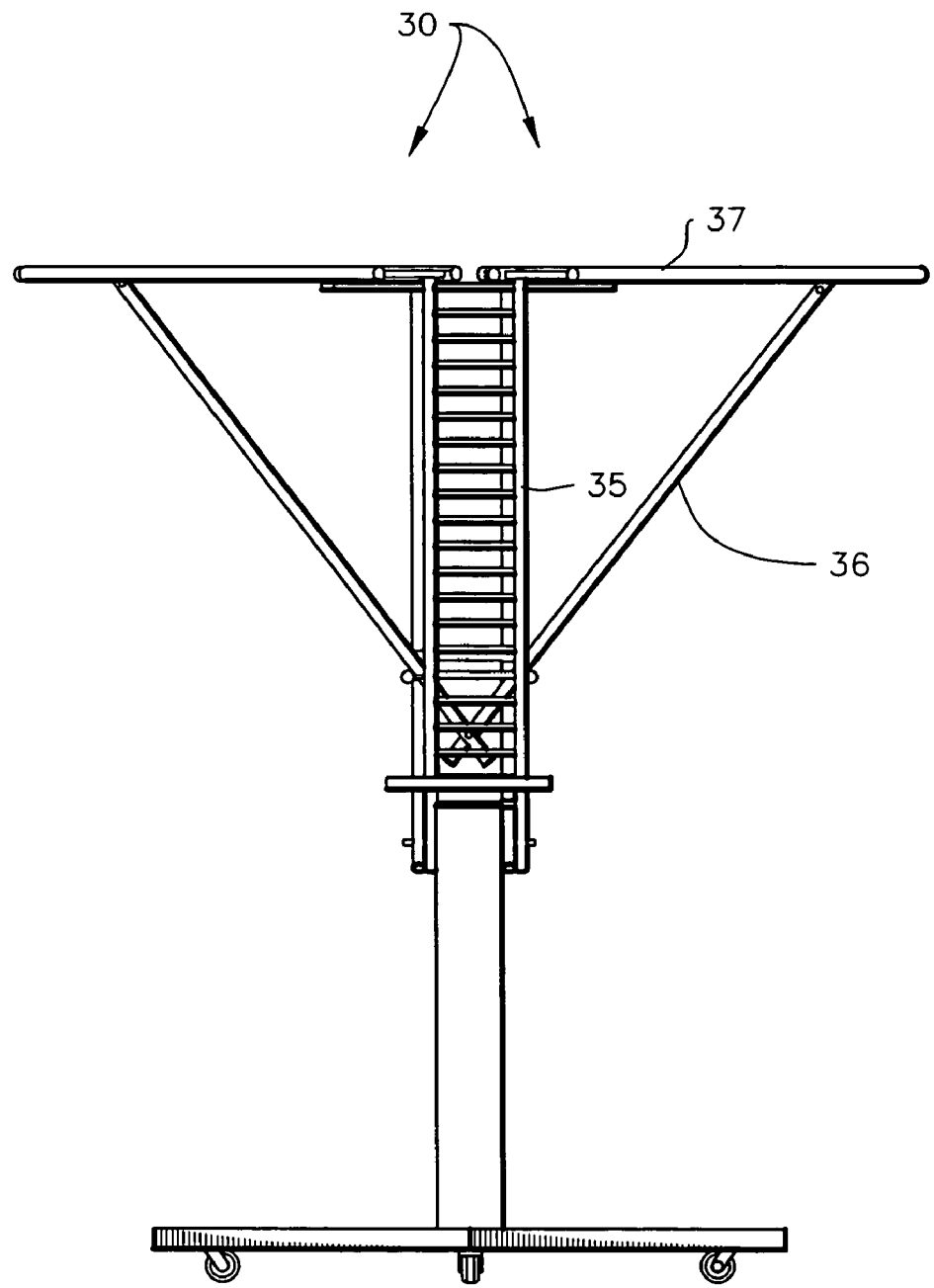
FIG. 8 is a rear plan view thereof.

Each pair of vertical ladders 35, 36 gives the appearance of an upwardly divergent "V-shaped" structure (i.e., when viewed in plan) that emulates the natural canopy of a tree. Ladders 35 occupy a plane that is perpendicular to the plane established by ladders 36. For example, in FIG. 3 the upper vertical ladders 36 form a V-shaped appearance, extending from their support bracket to the upper horizontally disposed ladders 37, 37 that form a planar top for the assembly 30. The aligned tops of the vertical ladders thus form a plane elevated above the base that is occupied by the horizontal top ladders. As viewed in FIG. 3, ladders 35 appear to be oriented straight up. Concurrently, in FIG. 4 it is seen that the lower vertical ladders 35 form a similar V-shaped profile that is seen in plan from a viewpoint disposed 90 degrees radially from the viewpoint of FIG. 3. In FIGS. 4 and 5, ladders 36 appear to be aligned straight up. In FIG. 6, a "birds-eye" view looking down shows that the ladders 35, 36 appear to be crossed, and that the horizontal platform ladders 37 at the top of the assembly 30 appear to surround the periphery. Also, as viewed in FIGS. 6 and 7, there are unblocked regions 40 resulting between the unconnected ends of platform ladders 37, 37. These features cumulatively give the perch apparatus 30 then appearance of a tree or other natural object that is readily accepted by most exotic pet birds.

Figure 9:
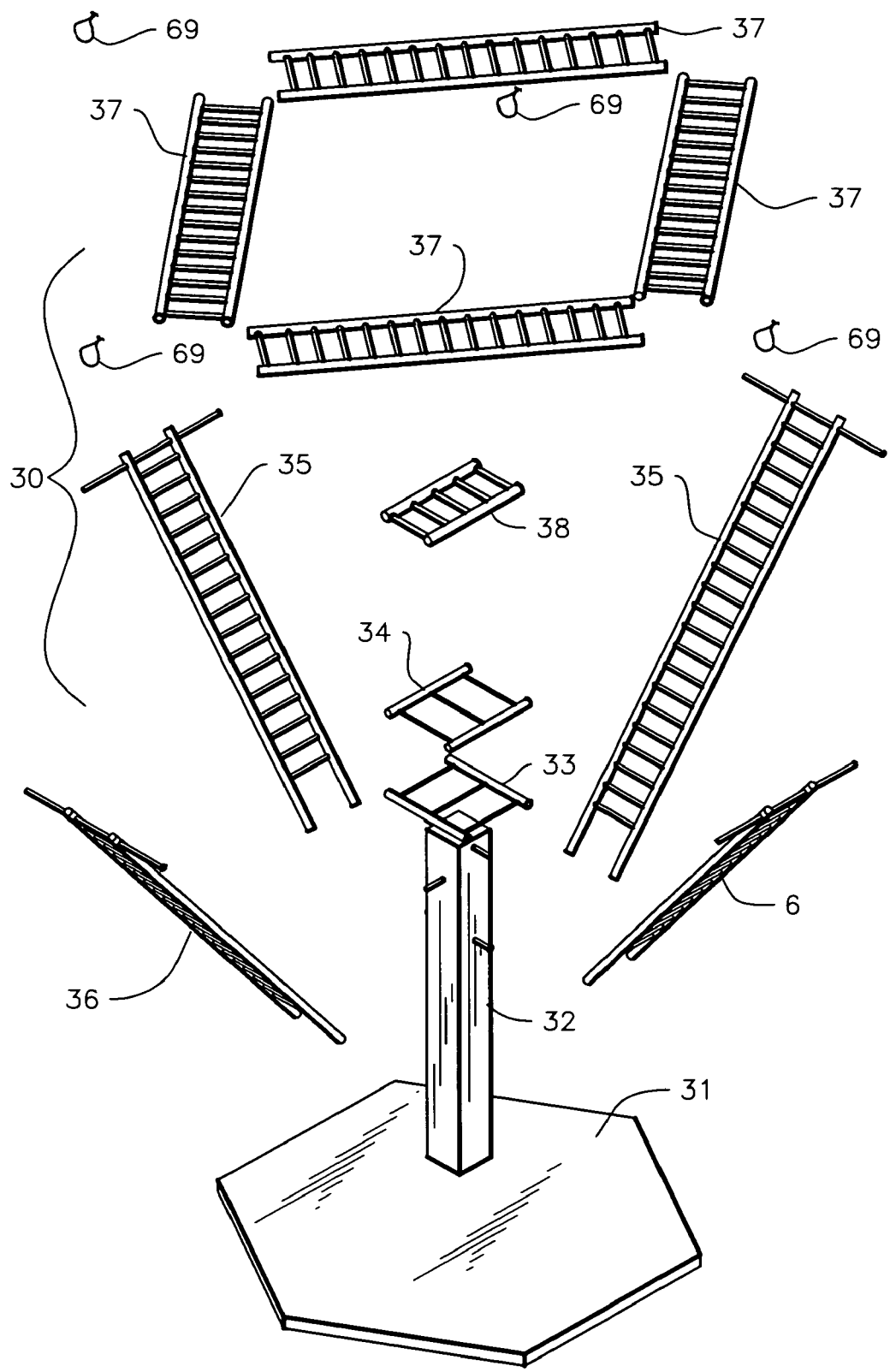
FIG. 9 is an exploded, top isometric view thereof.
Figure 10:
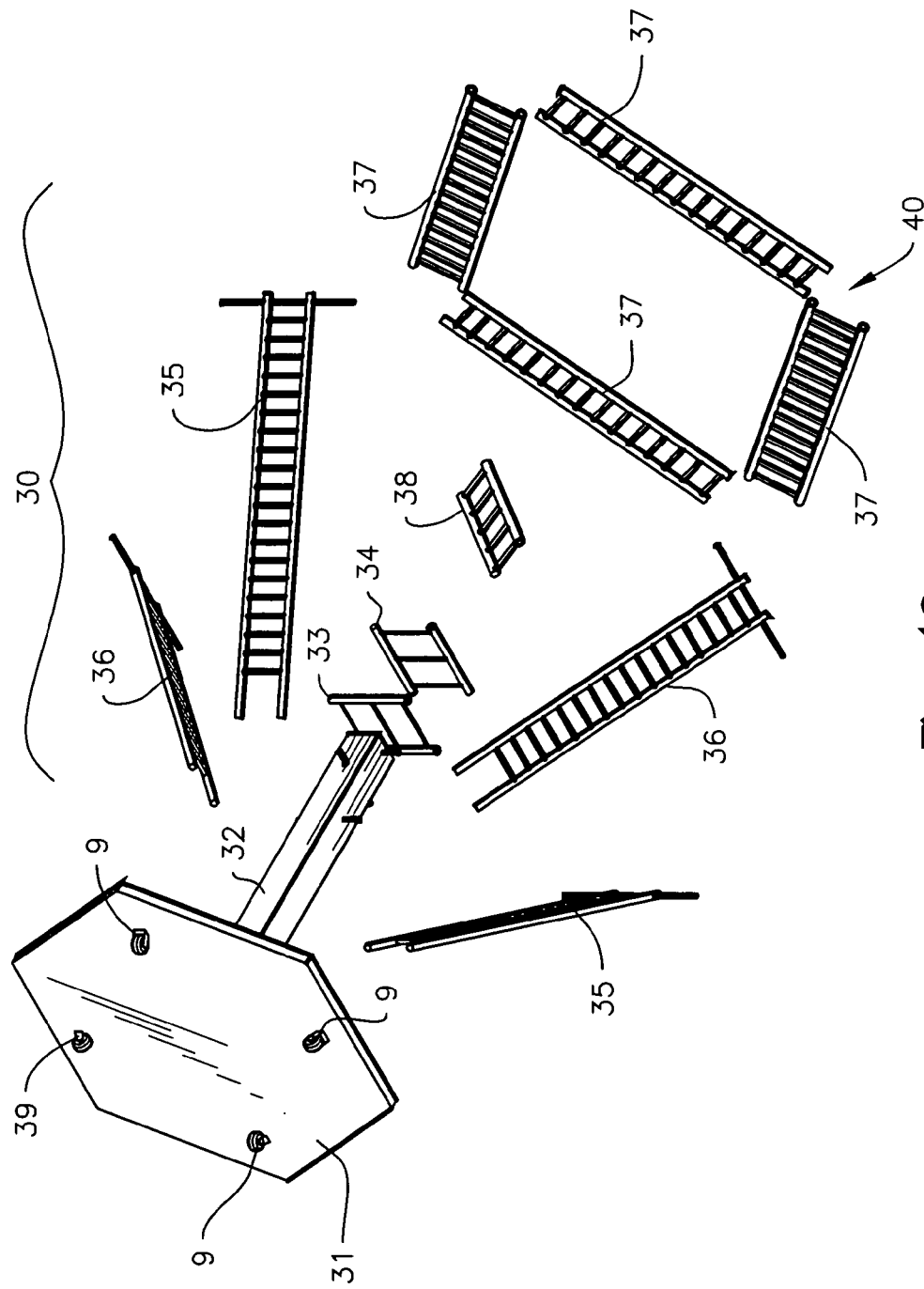
FIG. 10 is an exploded, bottom isometric view thereof.
Figure 11:
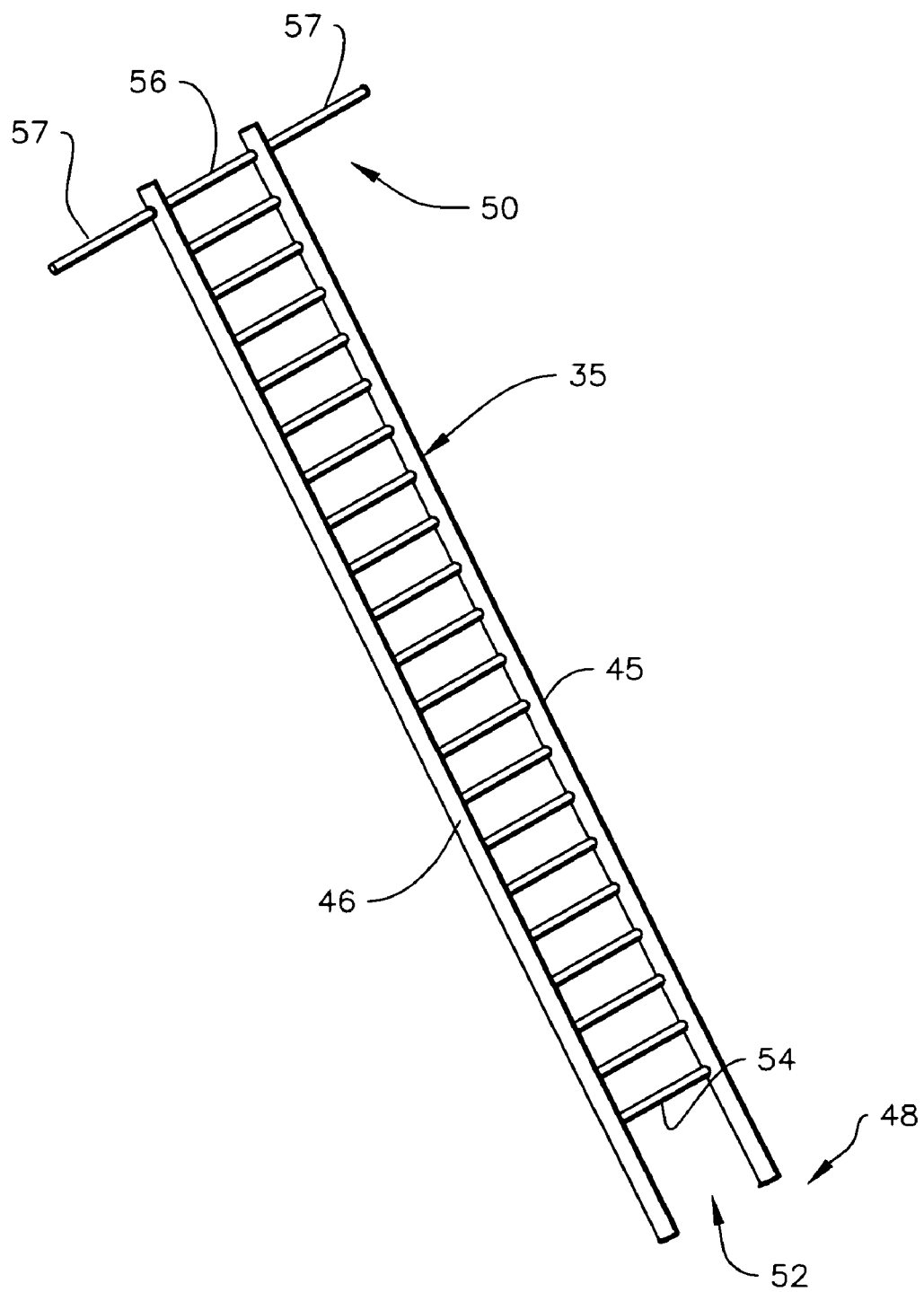
FIG. 11 is an enlarged isometric view of a preferred vertical ladder.

With joint reference now directed to FIGS. 9–11, rung spacing on the vertically inclined ladders 35, 36 is approximately three inches. Preferably there is narrower rung spacing on the horizontal platform ladders 37 (i.e., two inches in the best mode.) I have found that the rung spacing is important. The narrower spacing atop the perch 30 provides a more secure landing point. This encourages bird walking, playing, running, and resting. On the other hand, the wider rung spacing on the vertical ladder elements facilitate faster movements, as occurs when a bird jumps downwardly and accelerates during play.

In FIG. 11 a typical vertical ladder 35 is seen. These ladders (and ladders 37) are preferably made from South American wood. Ladders 35 and 36 are quite similar. Ladder 35 has a pair of elongated, parallel side rails 45, 46 extending from the bottom 48 of the ladder to the top 50. There is a clearance gap 52 (FIG. 11) at the ladder bottom 48, beneath lowermost rung 54. This gap clears the post 32 when the ladder is mounted, as clarified in FIG. 12. The uppermost rung 56 at the top 50 of the ladder (FIG. 11) is longer than the rest of the ladder rungs that extend only between ladder sides 45, 46. Rung 56 has outwardly extended wings 57 that project laterally away from the ladder sides. The wings 57 associated with rung 56 support the upper ladders 37, that are fastened to it with suitable cable ties 69 (i.e., FIG. 9).

Figure 12:
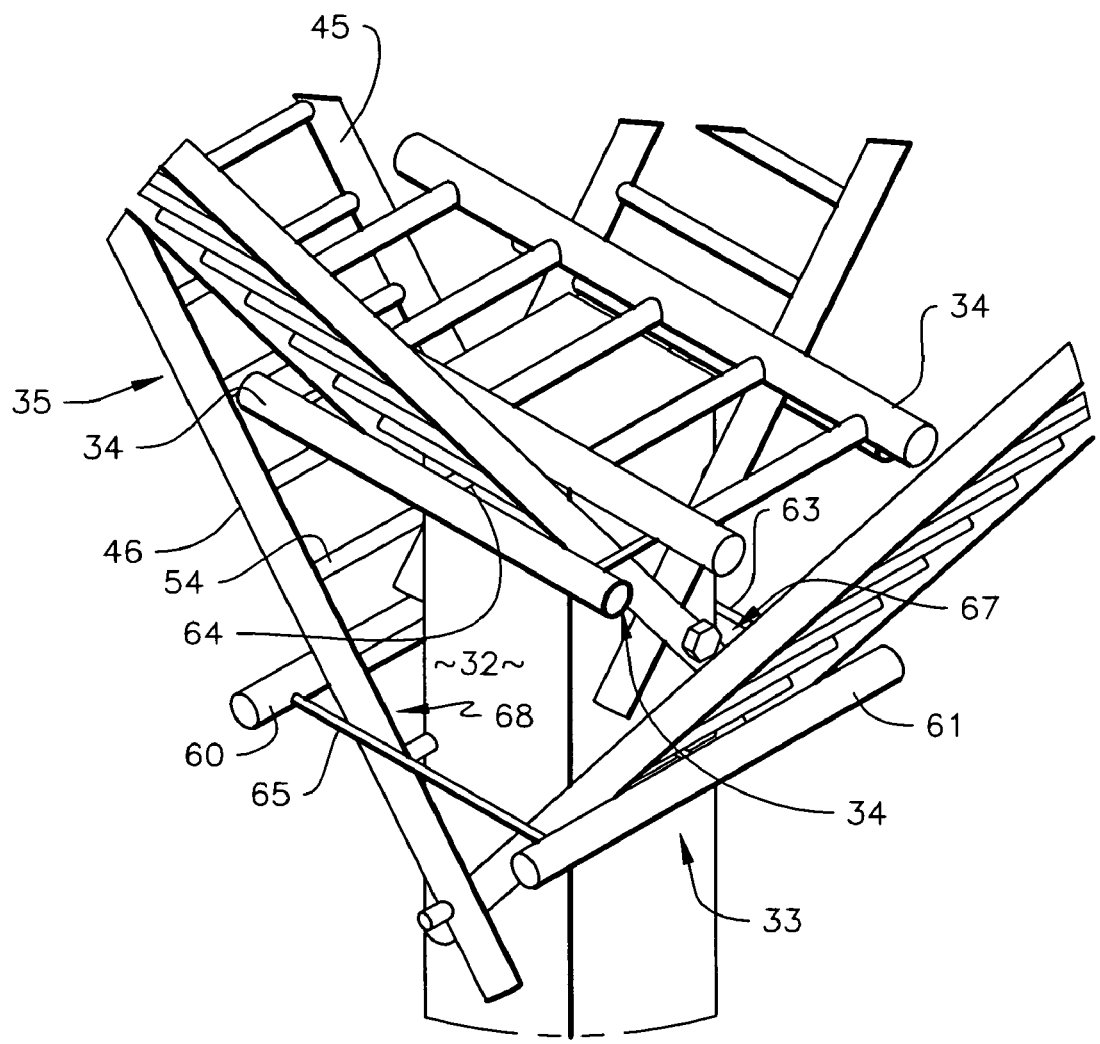
FIG. 12 is an enlarged, fragmentary frontal isometric view of the assembled bracket and vertical ladder structures.

Particularly referencing FIGS. 12–14 and 18 and 19, the upper and lower support brackets 34, 35 are substantially similar. Each has a pair of rigid, spaced apart sides 60, 61. These parallel sides 60, 61 have outermost, rigid, parallel, cross rails 63, and 65 extending between them. A center, parallel penetration rail 64 will penetrate the post 32 in assembly (FIG. 12). A clearance gap 67 (FIG. 19) exists between penetration rail 64 and cross rails 63. A similar generally rectangular clearance gap 68 is formed between the penetration rail 64 and the other cross rails 63 and/or 65.

Figure 13:
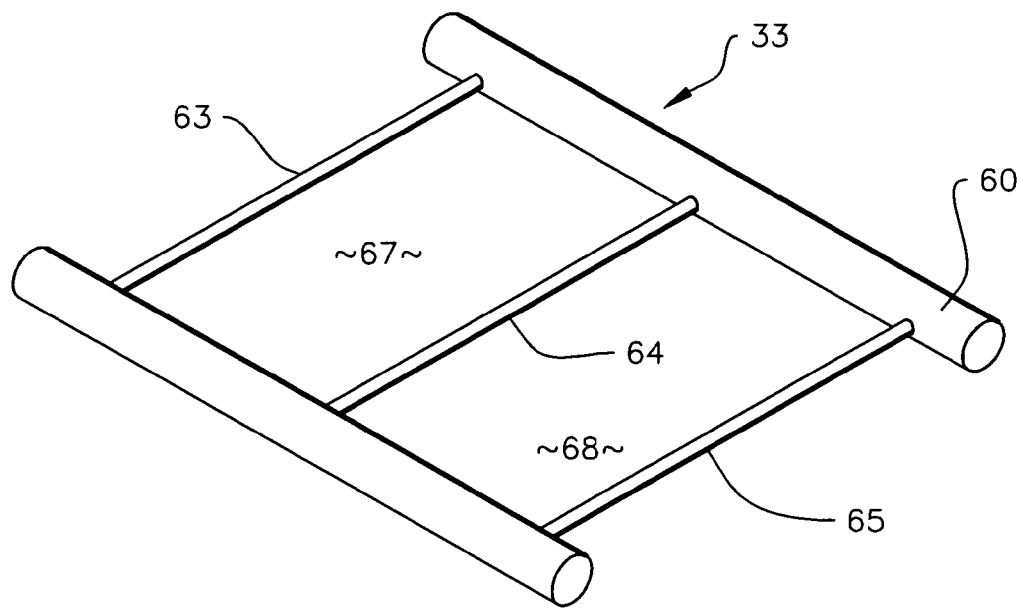
FIG. 13 is an enlarged isometric view of the lower support bracket.
Figure 14:
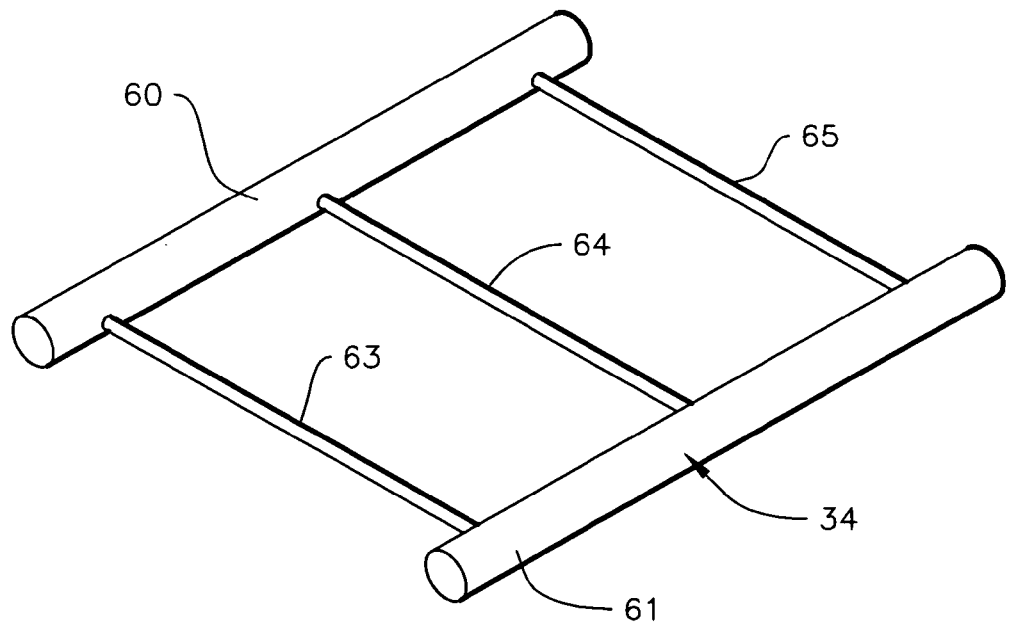
FIG. 14 is an enlarged isometric view of the upper support bracket.

The bottom leg portions of the vertical ladders 35, 36 are received through clearance regions 67, 68, and the vertical ladders lean against cross rails 63 or 65 when assembled. The ladder sides 45, 46 (FIG. 11) are constrained between the rigid, outer support bracket sides 60, 61 (FIGS. 12–14). The lowermost ends 64 (FIG. 12) of the vertical ladders are pinned together with a fastener 64 that attaches them to post 32.

Figure 15:
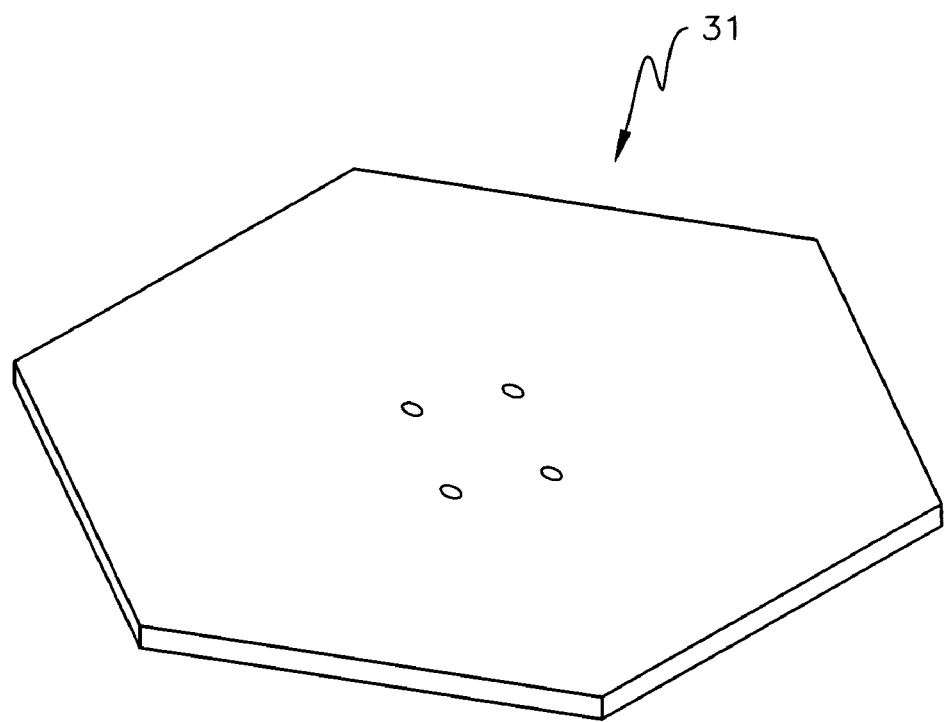
FIG. 15 is a top isometric view of the preferred base plate.
Figure 16:
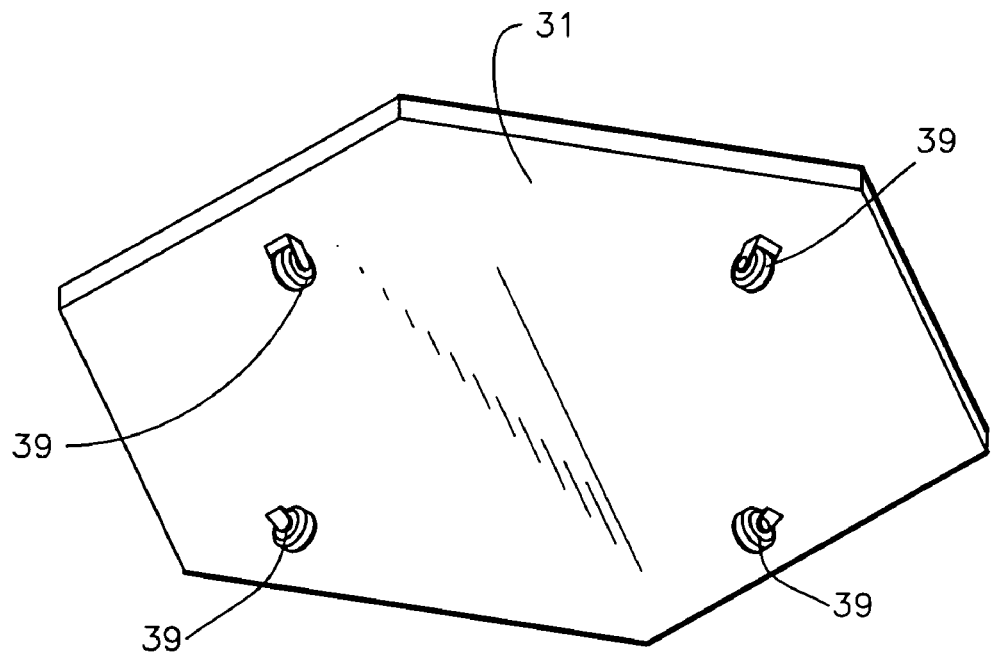
FIG. 16 is a bottom isometric view of the preferred base plate.
Figure 17:
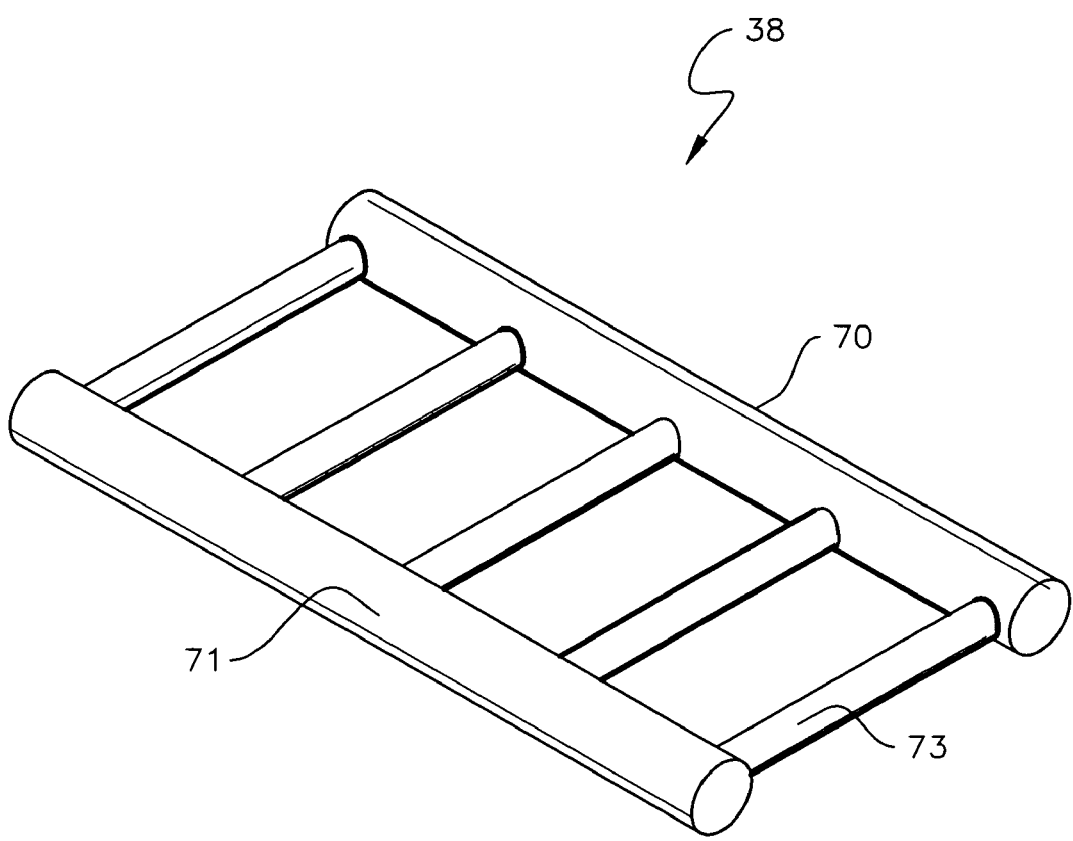
FIG. 17 is an enlarged isometric view of the preferred center ladder.
Figure 18:
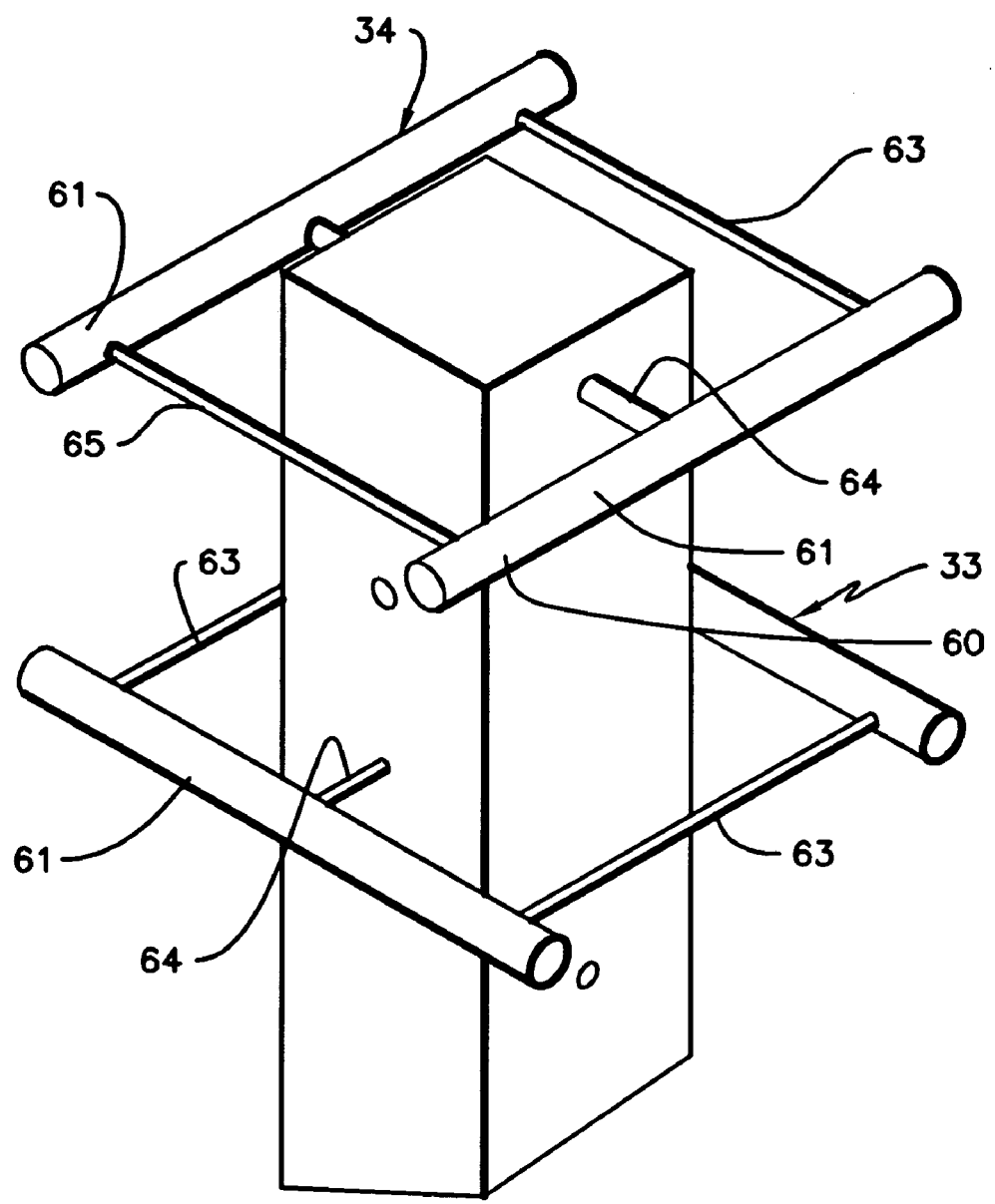
FIG. 18 is an enlarged, fragmentary frontal isometric view of the preferred bracket structure; and, FIG. 19 is an enlarged, fragmentary side isometric view of the preferred bracket structure.
Figure 19:
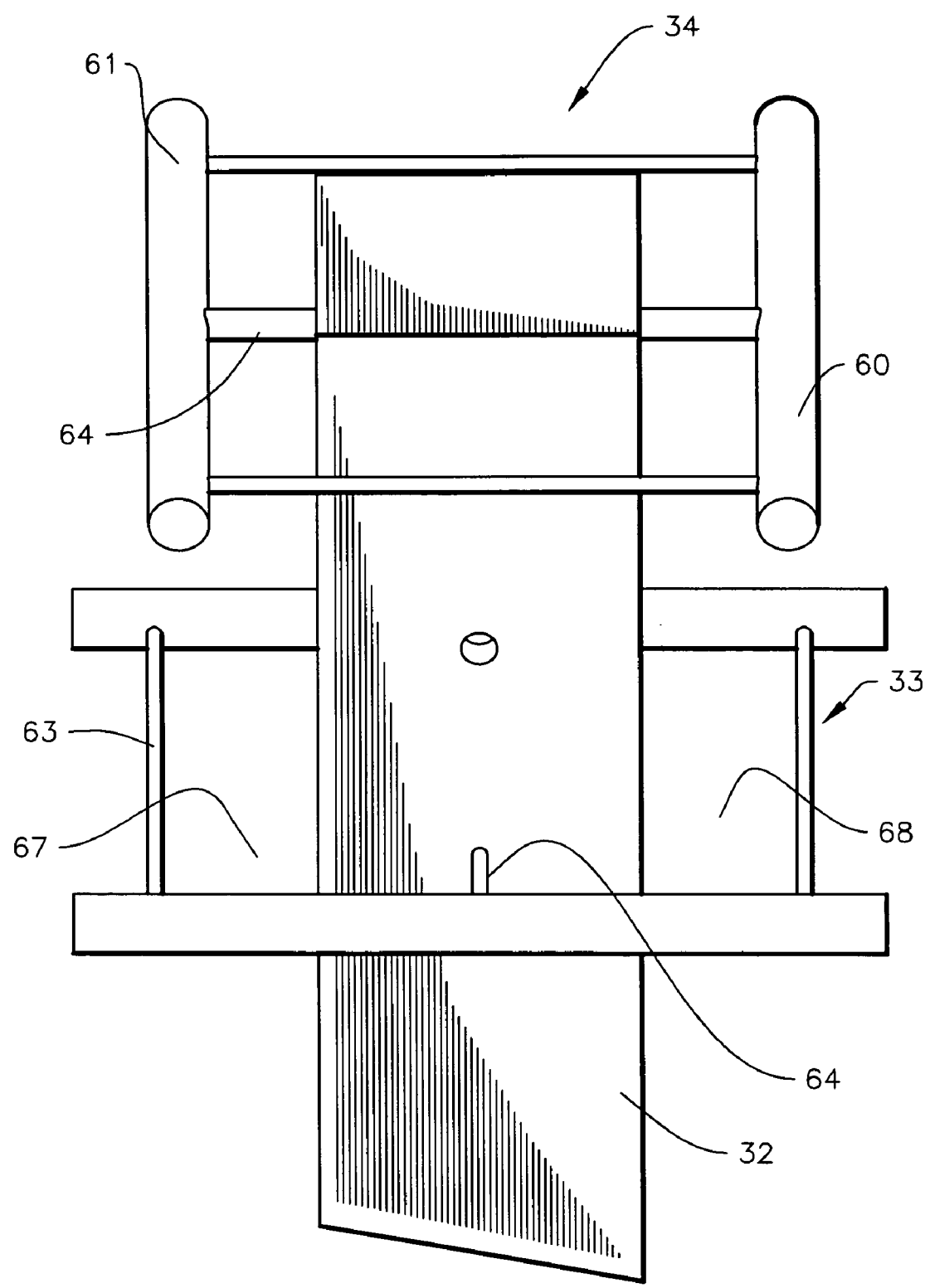

Referencing FIGS. 15, 16, the base 31 is made of wood. It is preferably polygonal, and in this instance it is hexagonal. FIG. 17 shows the construction of intermediate horizontal ladder 38, which is secured horizontally at the apex o a pair of vertical ladders. A pair of rigid, elongated and parallel sides 70, 71 constrain parallel rungs 73.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An artificial animal perch comprising:
   a generally planar base adapted to be disposed upon a supporting surface;
   a vertically upright, supporting post supported by the base;
   a lowermost pair of vertically inclined, upwardly extending ladders that diverge upwardly and terminate in tops;
   an upper pair of vertically inclined, upwardly extending ladders that diverge upwardly and terminate in tops;
   a lower support bracket mounted to said post above said base for supporting said lowermost pair of vertically inclined ladders;
   an upper support bracket mounted to said post above said base for supporting said upper pair of vertically inclined ladders; and,
   wherein said tops of said upper pair of ladders are coplanar with the tops of the lowermost pair of ladders to form a stable top of the perch.

2. The animal perch as defined in claim 1 wherein a plurality of horizontal ladders are disposed at the top of the perch, and extend between the aligned tops of the lowermost pair and the upper pair of vertically inclined ladders.

3. The animal perch as defined in claim 2 wherein said lowermost pair of vertically inclined ladders are longer than said upper pair of ladders so that said tops of all vertical ladders are substantially coplanar.

4. The animal perch as defined in claim 2 wherein the perch further comprises an intermediate, reduced-length horizontal ladder disposed below said top and occupying a plane that is parallel with said base.

5. The animal perch as defined in claim 2 wherein the perch further comprises unblocked regions formed between ends of adjacent horizontal platform ladders at the top of the perch.

6. The animal perch as defined in claim 2 wherein the upper and lower support brackets each comprise a pair of rigid, spaced apart sides, a pair of rigid, parallel, outermost cross rails extending between the sides, center penetrating cross rails that penetrate said post in assembly, and clearance gaps defined between the outermost cross rails and the center penetrating rails.

7. The animal perch as defined in claim 2 wherein all vertical ladders and all horizontal ladders comprise multiple spaced-apart rungs, and rung spacing on the vertically inclined ladders is greater than the rung spacing on the horizontal platform ladders.

8. The animal perch as defined in claim 7 wherein the vertical ladders comprise upper ladder rungs that are longer than the rest of the ladder rungs and have outwardly extended wings that project away from the ladder sides for supporting horizontal, platform ladders.

9. A bird perch that emulates a natural tree, said perch comprising:
   a base adapted to be disposed upon a supporting surface;
   a rigid post extending vertically upwardly from said base;
   at least one pair of vertically inclined, upwardly extending ladders that diverge upwardly to emulate a tree canopy, said ladders comprising a plurality of spaced apart rungs and said ladders terminating in tops;

at least one support bracket mounted to said post above said base for supporting said vertically inclined ladders, each support bracket comprising a center penetrating rail that penetrates said post and a pair of parallel, spaced-apart side rails against which the vertically inclined ladders rest when the perch is assembled; and, a plurality of horizontally disposed platform ladders extending between tops of said vertically inclined ladders to form a top for said perch, said platform ladders comprising a plurality of spaced apart rungs.

10. The bird perch as defined in claim 9 wherein the perch further comprises an intermediate, reduced-length horizontal ladder disposed below said top and occupying a plane that is parallel with said base.

11. The bird perch as defined in claim 9 wherein the perch further comprises unblocked regions formed between ends of adjacent horizontal platform ladders at the top of the perch.

12. The bird perch as defined in claim 9 wherein rung spacing on the vertically inclined ladders is greater than the rung spacing on the horizontal platform ladders.

13. The bird perch as defined in claim 9 wherein the vertical ladders comprise upper ladder rungs that are longer than the rest of the ladder rungs and have outwardly extended wings that project away from the ladder sides for supporting the horizontal, platform ladders.

14. An artificial tree structure for pets, said structure comprising:

a rigid upwardly extending vertical post;

vertically inclined, upwardly extending ladders that diverge upwardly to emulate a tree canopy, said ladders comprising a plurality of spaced apart rungs, and said ladders terminating in tops;

means for mounting said vertically inclined ladders comprising a center penetrating rail that penetrates said post and a pair of parallel, spaced-apart side rails against which the vertically inclined ladders rest; and, a plurality of horizontally disposed platform ladders extending between said tops of said vertically inclined ladders to form a top for said perch, said platform ladders comprising a plurality of spaced apart rungs.

15. The structure as defined in claim 14 further comprising an intermediate, reduced-length horizontal ladder disposed below said top and extending between vertically inclined ladders.

16. The structure as defined in claim 15 further comprising unblocked regions formed between ends of adjacent horizontal platform ladders.

17. The structure as defined in claim 15 wherein rung spacing on the vertically inclined ladders is greater than the rung spacing on the horizontal platform ladders.

18. The structure as defined in claim 17 wherein the vertical ladders comprise upper ladder rungs that are longer than the rest of the ladder rungs and have outwardly extended wings that project away from the ladder sides for supporting the horizontal, platform ladders.

19. The structure as defined in claim 18 wherein said vertically inclined ladders comprise a first pair of vertically inclined ladders occupying first plane, and a second pair of vertically inclined ladders disposed above said first pair that occupy a second plane, said first and second planes being perpendicular.

* * * * *